Aug. 9, 1932.  R. P. JACQUES  1,871,370
COUPLING TERMINAL FOR CONDUITS
Filed June 7, 1927  2 Sheets-Sheet 2
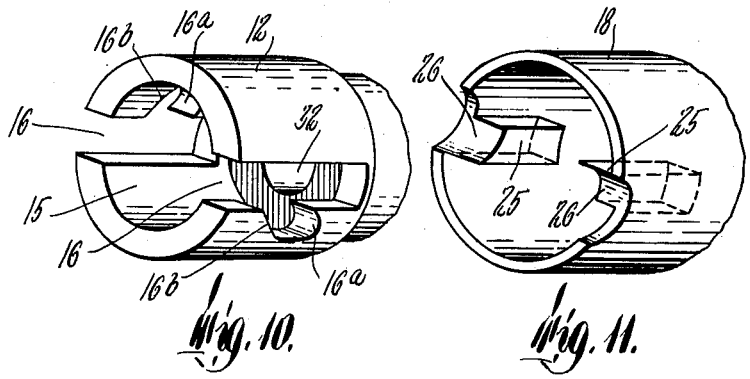
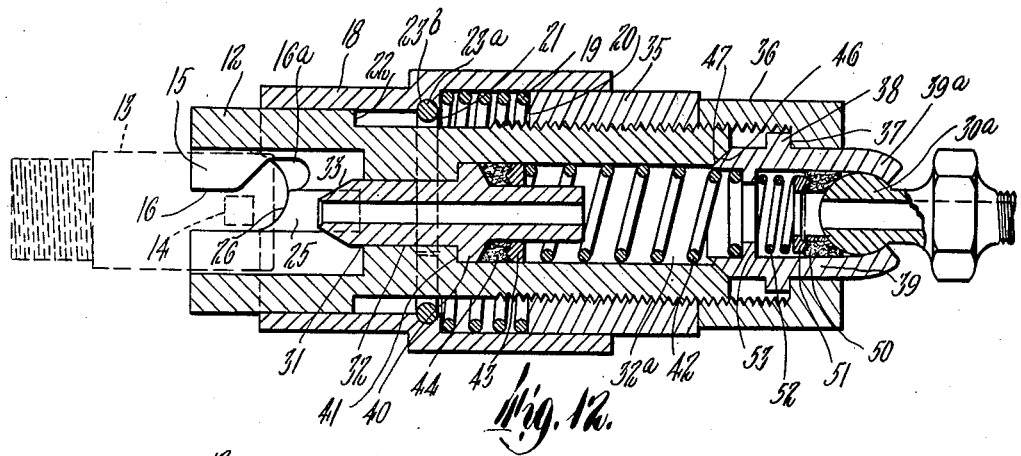
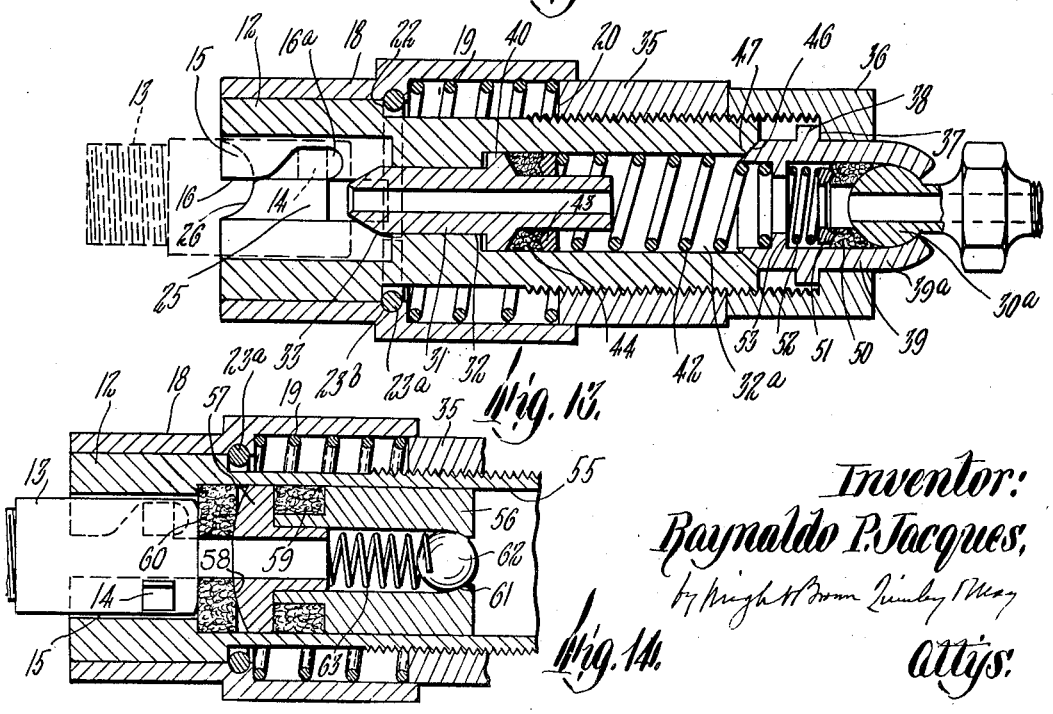
Inventor:
Raynaldo P. Jacques, Patented Aug. 9, 1932

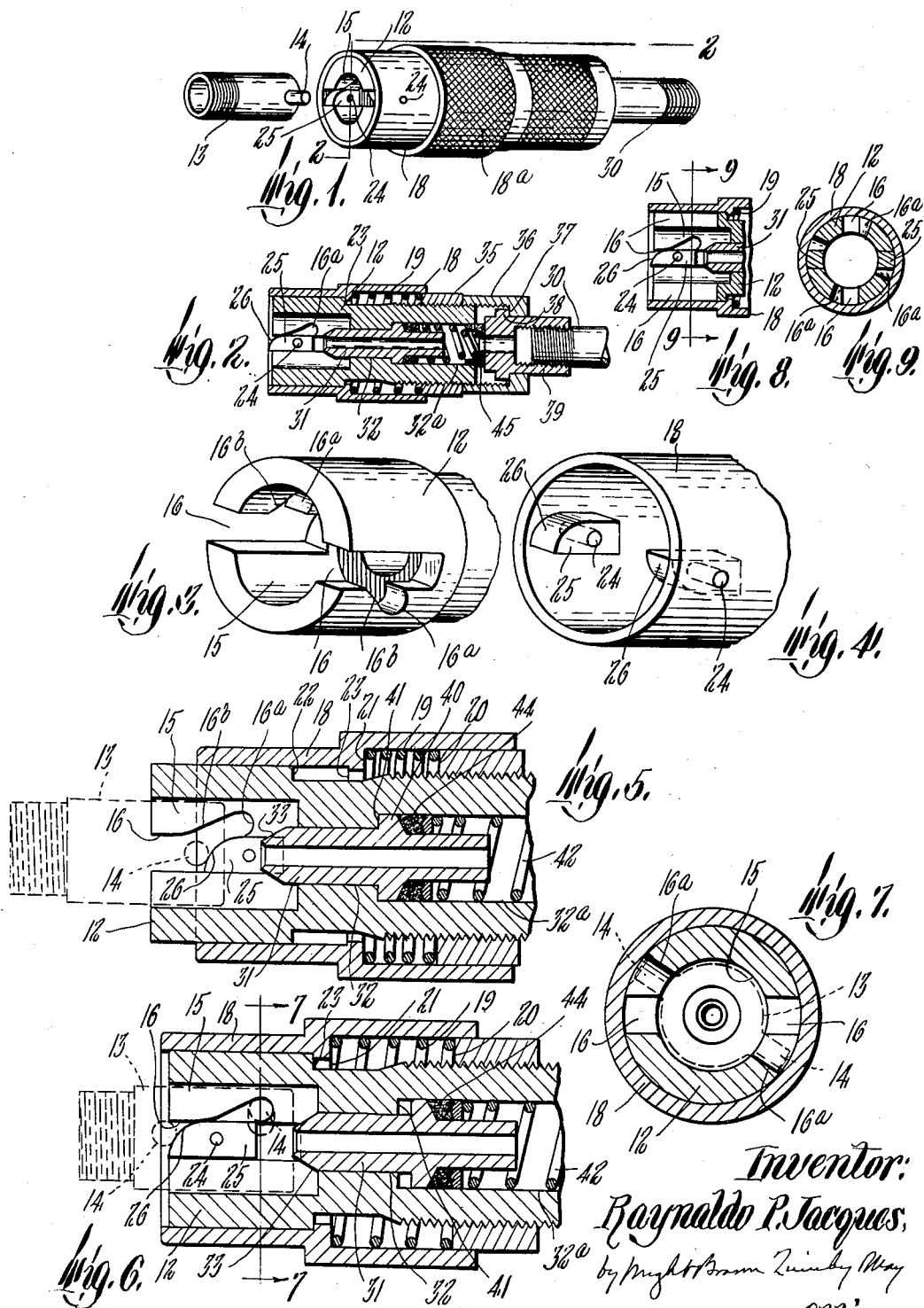

1,871,370

UNITED STATES PATENT OFFICE

RAYNALDO P. JACQUES, OF WOONSOCKET, RHODE ISLAND, ASSIGNOR TO ADAMS INDUSTRIES, INC., OF NEW YORK, N. Y., A CORPORATION OF NEW YORK

COUPLING TERMINAL FOR CONDUITS

Application filed June 7, 1927. Serial No. 197,127.

The invention relates generally to a terminal carried by and forming a part of a conduit or conduit portion, and having means whereby it may be separably connected with another conduit or conduit portion having bayonet-joint studs.

In the embodiment of the invention hereinafter described, the conduit portion carrying the terminal is flexible and adapted to conduct a lubricant, such as grease, from a grease gun or pressure system, and the other conduit portion is a fixed nipple or grease cup having bayonet-joint studs and communicating with a bearing to be lubricated. The invention is not limited, however, to a lubricant conduit, and may be embodied in any conduit in which the improvements hereinafter claimed may be found useful, and in which the conduit portion having the bayonet-joint studs, is movable instead of fixed. I consider said improvements chiefly useful in a conduit for a lubricant such as grease under pressure, the coupling terminal in which the invention is embodied being at the free end of a flexible conduit connected with a grease gun or pressure system, the terminal being provided with means for separable connection with a nipple or grease cup, fixed to a bearing and having bayonet-joint studs.

Heretofore, so far as I am aware, the terminal has been provided with angular slots cooperating with the nipple studs, so that the studs and slots constitute a coupling which, owing to the angularity of the slots, and to the fact that the grease is under compression in the conduit and nipple, requires a forcible partial rotation of the terminal to disconnect it from the nipple. In many cases tools have to be used to disconnect the terminal from the nipple.

In accordance with my invention, I have improved the construction of the terminal and the form of its stud-receiving slots, and have combined therewith a locking means, in such manner that the disengagement of the nipple studs from the slots of the terminal, is not opposed by the form of the slots, and by the compression of the grease, and is opposed only by locking means, adapted to cooperate with the slots and studs in positively locking the terminal to the nipple, said locking means being normally held yieldingly in locking position, adapted to be first displaced and then released by the studs, to successively cause a non-positive and a positively locked engagement of the terminal with the nipple, the locking means being manually displaceable to release the terminal from the nipple.

Of the accompanying drawings forming a part of this specification,—

Figure 1 shows in perspective a conduit terminal embodying the invention, and a nipple or grease cup adapted for attachment to a bearing and provided with bayonet-joint studs.

Figure 2 is a longitudinal section on the plane indicated by line 2—2 of Figure 1.

Figures 3 and 4 are fragmentary enlarged perspective views, showing portions of the terminal, Figure 3 showing the body, and Figure 4 the locking means of the terminal.

Figures 5 and 6 are enlarged sectional views, Figure 5 showing the keeper retracted, while Figure 6 shows it projected.

Figure 7 is a section on line 7—7 of Figure 6.

Figure 8 is a fragmentary sectional view, similar to a portion of Figure 2, showing a modification.

Figure 9 is a section on line 9—9 of Figure 8.

Figures 10 and 11 are views similar to Figures 3 and 4, showing variations.

Figures 12 and 13 are views similar to Figures 5 and 6, showing other variations.

Figure 14 is a view similar to a portion of Figures 12 and 13, showing certain changes in the form and construction of the movable nozzle.

The same reference characters indicate the same parts in all of the figures.

12 designates a cylindrical terminal constituting the free end of a conduit adapted to conduct grease from a grease gun or pressure system (not shown) and adapted also for detachable connection with a nipple or grease cup 13, which communicates with a bearing to be lubricated, and is provided with bayonet-joint studs 14, usually projecting from diametrically opposite sides of the nipple, as indicated by dotted lines in Figure 7.

The terminal has an enlarged bore portion 15, adapted to receive the nipple, and longitudinal slots 16, adapted to receive the studs 14, and formed to permit a partial rotation of the terminal on the nipple, in one direction, when the nipple is entering the bore, and in the opposite direction when the nipple is leaving the bore, the form of the slots whereby these partial rotations are permitted being due in this instance, to inclined lateral extensions or recesses formed in walls of the slots and forming open sockets 16a and inclines 16b best shown by Figures 3, 4 and 5. The inclines permit the entrance of the studs into the sockets when the nipple is entering the terminal, the arrangement of the inclines being such that the studs have a non-positive engagement with the sockets, and may be withdrawn therefrom without resistance when the sockets are open, as shown by Figures 5 and 12. When the terminal is being withdrawn from the nipple, the inclines 16b permit a practically unopposed separation of the terminal from the nipple.

The terminal is provided with spring-pressed locking means, adapted to cooperate with the slots and studs in positive-locking the terminal to the nipple, said locking means being normally held yieldingly in locking position, adapted to be successively displaced and released by the studs, to first permit a non-positive and then a positively locked engagement of the terminal with the nipple, the locking means being manually displaceable to release the terminal from the nipple.

I have embodied said means in spring-pressed keepers, movable in the slots 16, and formed to cooperate with the slots and studs in positively locking the terminal to the nipple, said keepers being normally held yieldingly in locking position, and successively displaceable and releasable by the studs, when the terminal is receiving the nipple, the keepers being manually displaceable without resistance by the grease, to permit the unobstructed removal of the terminal from the nipple.

In the preferred embodiment of the invention here shown, the locking means includes a sleeve 18, movable longitudinally on the periphery of the terminal, and normally projected toward the outer end thereof by a spring 19, interposed between a shoulder 20, fixed to the terminal and an internal shoulder 21 on the sleeve.

The projection of the sleeve is limited by stop shoulders 22 and 23, formed respectively on the terminal and the sleeve. Fixed to the sleeve as by rivets 24 (Figure 4), or by being formed integral with the sleeve, are keepers 25, which are movable endwise in the slots 16, and are formed to close the sockets, as shown by Figure 6, when the sleeve is projected, and to open the sockets, as shown by Figure 5, when the sleeve is retracted.

The keepers have end faces 26, arranged to abut the studs 14, when the terminal is being moved on to the nipple, the pressure of the end faces on the studs causing the retraction of the keepers to the position shown by Figure 5. The faces 26 are preferably inclined to automatically guide the studs into the sockets, when the keepers and studs are in the relative positions shown by Figure 5. When the studs enter the sockets, they release the keepers which are automatically returned by the spring to the socket-closing position shown by Figure 6, the studs being positively locked in the sockets. When the terminal is to be removed from the nipple, the operator manually retracts the sleeve and the keepers, thus permitting the studs to leave the sockets and move outward through the mouth portions of the slots, this movement causing a partial rotation of the terminal on the nipple.

It will now be seen that the separation of the terminal from the nipple is unopposed by compressed grease in the terminal and nipple, the manual retraction of the sleeve and keepers being easily caused without resistance by the compressed grease. To facilitate the manual retraction of the sleeve I knurl a portion of its periphery, as indicated at 18a in Figure 1.

The terminal may be provided with any desired number of slots and the nipple with a corresponding number of studs. Figures 8 and 9 show the terminal provided with four slots, each adapted to receive a stud on the nipple.

The keepers shown by Figures 11, 12 and 13 are integral with the sleeve 18, instead of being riveted thereto. When the keepers are riveted to the sleeve, the rivets 24 may be applied after the sleeve and terminal are assembled as shown by Figures 1 and 2, and the internal stop shoulder 23 may be integral with the sleeve. When the keepers are integral with the sleeve, which is preferable on account of superior strength and durability, the internal stop shoulder must be separately formed and applied to the sleeve, after the sleeve and terminal are assembled.

Figures 12 and 13 show a separately formed internal stop shoulder 23a which, in this instance, is a resilient split ring sprung into an internal groove 23b in the sleeve, before the collar 35 hereinafter described, is applied to the terminal 12. The terminal 12 is externally threaded at its rear portion and with said portion is engaged an internally threaded collar 35, forming the abutment 20 of the spring 19, and a coupling nut or union 36, the internal shoulder 37 of which engages a peripheral shoulder 38, on a nipple 39, constituting an end member of a flexible conduit which may be of any suitable construction.

The terminal 12 has a reduced central bore portion 32, and a somewhat larger inner bore portion 32a, both concentric with the nipple-receiving bore 15. 31 designates a discharge nozzle extending through and movable in the central bore portion 32, and provided with a tapered outer end face 33, which partly enters the bore of the nipple 13, when the latter is fully entered in the terminal 12. The nozzle 31 is provided with a peripheral flange 40, adapted to bear on an internal stop shoulder 41. A spring 42 is interposed between the shoulder 40 and the shouldered nipple 39, and normally projects the outer end of the nozzle 31 into the outer bore 15 of the terminal, as far as the stop shoulder 41 permits. The arrangement is such that when the nipple 13 is fully entered in the terminal the nozzle 31 is caused to yield, as shown by Figure 6, and its conical end is pressed firmly by the spring 42 against the bore of the nipple 13, so that leakage of grease into the nipple-receiving bore of the terminal is prevented.

One side of the flange 40 is bevelled, and against this side is pressed by the spring 42 and by the grease pressure, an annular compressible packing washer 44, which is crowded against the crevice between the flange 40 and the bore 32a and prevents leakage of grease around the nozzle 31. A spreader ring or washer 43, one side of which is an annular wedge, is pressed by the spring 42 against the compressible washer 44 and laterally expands the same against the nozzle 31 and the bore 32a.

The inner end of the shouldered nipple 39 has a joint-forming face, surrounding its bore and cooperating with a joint-forming face on the opposed end of the terminal 12, in forming a tight joint preventing leakage of grease between the nipple 39 and the inner end of the terminal 12. The joint face on the terminal may be provided by one side of a cup washer 45 (Fig. 2) whose margin closely fits and is movable in the bore portion 32a, the washer bearing on the spring 42, as shown by Figure 2.

Figures 12 and 13 show the shouldered nipple 39 provided with a tapered conical annular joint face 46, fitting a tapered recessed annular joint face 47, on the terminal 12, the joint being formed by the meeting of the two metal faces 46 and 47.

The shouldered nipple 39, which as before stated, constitutes an end member of the flexible conduit, may be engaged with another member 30 of said conduit formed as a short cylindrical tube as shown by Figures 1 and 2. I prefer, however, to provide the nipple 39 with a contracted end portion forming a socket 39a, as shown by Figures 12 and 13, engaged with a ball shaped portion 30a formed on another member of the conduit shown in my co-pending application for Letters Patent for Improvement in flexible conduits, filed concurrently herewith, said conduit being composed of a series of articulately connected units on one of which the ball shaped portion 30a is formed. The socket 39a and the ball shaped portion 30a constitute a ball and socket joint which is packed by a wedge shaped packing ring or washer 50 of compressible material forced against a zone of the ball portion 30a by a spreading ring or washer 51 of rigid material having one of its sides formed as an annular wedge contacting with the washer 50 and expanding the latter outwardly against the bore of the nipple 39. The spreader ring is pressed by a spring 52 seated on a shoulder 53 in the shouldered nipple.

The bayonet-joint studs 14, on the nipple 13, may be square, as indicated by Figures 12 and 13, instead of circular as shown by preceding figures, the square form being the more strong and durable.

Figure 14 shows an alternative construction in which the terminal 12, having the cup-receiving outer bore 15, is provided with an inner bore 55 of larger diameter than the outer bore. The nozzle movable in the inner bore is, in this instance, composed of a body portion 56, and a separately formed outer portion 57, on which is formed an end face 58 which is opposed to the end face of a nipple-shaped grease cup 13, inserted in the outer bore 15, the end face 58 having a crowning or approximately conical form. The nozzle may be pressed endwise by grease forced into the inner bore 55, the spring 42 being omitted.

Figure 14 shows a compressible packing-ring or annular washer 60 applied to the end face 58 of the nozzle and adapted to be compressed between said end face and the opposed end face of the cup 13, the periphery of said ring having a close fit on the inner bore 55.

Figure 14 shows the nozzle bore contracted at its inner end to form a seat 61 for a check-valve 62, which is pressed against said seat by a spring 63 having sufficient force to hold the check-valve closed while the nozzle is being moved by grease pressure in the inner bore 55, and thereby prevent the passage of grease through the nozzle until the nozzle is arrested by the cup 13. The check-valve then yields to permit the passage of grease through the nozzle and into the cup.

The slots designated by 16, 16a and 16b constitute longitudinal and bayonet slots adapted as described, to receive the nipple studs 14. The keepers 25 on the sleeve 18 constitute means to engage the longitudinal slots 16 for the purpose stated.

The member 31, shown by Figures 2, 5, 12 and 13, called a discharge nozzle, is in effect a sealing member slidable in the bore portion 32, and adapted to engage the end of the bore of the nipple 13, to prevent escape of grease into the bore portion 15. Said member 31 is caused to perform its sealing function partly by lubricant pressure and partly by spring pressure.

The sealing member shown by Figure 14, performs the same function as the member 31, and is adapted to be actuated solely by the pressure of the lubricant.

I claim:

1. A detachable coupling member constituting a grease conduit element and having a bore and slots formed to receive a nipple and oppositely projecting bayonet joint studs thereon, said member having means operable by the entrance of the nipple into the bore to automatically turn or partially rotate the coupling member in one direction and lock the coupling member to the nipple, said means including a member which is movable by the studs when the nipple is entering the bore to cause first, a non-positive and then a positive engagement of the coupling member with the nipple, and is manually movable without resistance by grease compressed in the conduit to permit partial rotation of the coupling member in the opposite direction and permit the detachment of the coupling member from the nipple.

2. A detachable coupling member constituting a grease conduit element and having a bore formed to receive a nipple having oppositely projecting bayonet joint studs, said member having longitudinal slots communicating with its bore, and sockets offset from the inner ends of the slots, said slots and sockets being formed to permit a partial rotation of the coupling member on the nipple in one direction when the nipple is entering the bore, and thereby locate the studs in the sockets to non-positively engage the coupling member with the nipple, and in the opposite direction when the nipple is leaving the bore, and thereby permit the withdrawal of the studs from the sockets, and the separation of the coupling member from the nipple, and spring-pressed locking means adapted to cooperate with the sockets and studs to effect a partial rotation of the coupling member on the nipple and to automatically and positively lock the coupling member to the nipple when the studs are in the sockets, said means being manually movable without resistance by pressure of grease in the conduit to permit the detachment of the coupling member from the nipple.

3. A detachable coupling member constituting a grease conduit element and having a bore formed to receive a nipple having oppositely projecting bayonet joint studs, said member having longitudinal slots communicating with its bore, and sockets offset from the inner ends of the slots, said slots and sockets being formed to permit a partial rotation of the coupling member on the nipple in one direction when the nipple is entering the bore, and thereby locate the studs in the sockets to non-positively engage the coupling member with the nipple, and in the opposite direction when the nipple is leaving the bore, and thereby permit the withdrawal of the studs from the sockets, and the separation of the coupling member from the nipple, spring-pressed keepers movable in said slots and projecting into the bore of the coupling member, said keepers being adapted to cooperate with the sockets and studs to effect a partial rotation of the coupling member on the nipple and to automatically and positively lock the coupling member to the nipple when the studs are in the sockets, and manually movable without resistance by presence of grease in the conduit to permit the detachment of the coupling member from the nipple.

4. A detachable coupling member constituting a grease conduit element and having a bore formed to receive a nipple having oppositely projecting bayonet joint studs, said member having longitudinal slots communicating with its bore, and sockets offset from the inner ends of the slots, said slots and sockets being formed to permit a partial rotation of the coupling member on the nipple in one direction when the nipple is entering the bore, and thereby locate the studs in the sockets to non-positively engage the coupling member with the nipple, and in the opposite direction when the nipple is leaving the bore, and thereby permit the withdrawal of the studs from the sockets, and the separation of the coupling member from the nipple, spring-pressed keepers movable in said slots and projecting into the bore of the coupling member, said keepers being adapted to cooperate with the sockets and studs in automatically and positively locking the coupling member to the nipple when the studs are in the sockets, and manually movable without resistance by presence of grease in the conduit to permit the detachment of the coupling member from the nipple, said keepers being provided with inclined end faces adapted to automatically cause a partial rotation of the coupling member in one direction when the member is moved endwise on the nipple, and thereby cause the entrance of the studs into the sockets.

5. A detachable coupling member constituting a grease conduit element and having a bore formed to receive a nipple having oppositely projecting bayonet joint studs, said member having longitudinal slots communicating with its bore, and sockets offset from the inner ends of the slots, said slots and sockets being formed to permit a partial rotation of the coupling member on the nipple in one direction when the nipple is entering the bore, and thereby locate the studs in the sockets to non-positively engage the coupling member with the nipple, and in the opposite direction when the nipple is leaving the bore, and thereby permit the withdrawal of the studs from the sockets, and the separation of the coupling member from the nipple, spring-pressed keepers movable in said slots and projecting into the bore of the coupling member, said keepers being adapted to cooperate with the sockets and studs in automatically and positively locking the coupling member to the nipple when the studs are in the sockets, and a spring-pressed sleeve movable on the coupling member and fixed to the keepers, said sleeve being manually movable, without resistance by pressure of grease in the conduit, to permit the detachment of the coupling member from the nipple.

6. A detachable coupling member constituting a grease conduit element and having a bore formed to receive a nipple having oppositely projecting bayonet joint studs, said member having longitudinal slots communicating with its bore, and sockets offset from the inner ends of the slots, said slots and sockets being formed to permit a partial rotation of the coupling member on the nipple in one direction when the nipple is entering the bore, and thereby locate the studs in the sockets to non-positively engage the coupling member with the nipple, and in the opposite direction when the nipple is leaving the bore, and thereby permit the withdrawal of the studs from the sockets, and the separation of the coupling member from the nipple, spring-pressed keepers movable in said slots and projecting into the bore of the coupling member, said keepers being adapted to cooperate with the sockets and studs to effect a partial rotation of the coupling member on the nipple and to automatically and positively lock the coupling member to the nipple when the studs are in the sockets, and manually movable without resistance by presence of grease in the conduit to permit the detachment of the coupling member from the nipple, said sockets being inclined relative to the slots and the axis of the coupling member to cause a partial rotation of said member on the nipple and permit an unobstructed withdrawal of the studs from the sockets when the keepers are displaced from their socket-closing positions.

7. A detachable coupling member comprising, in combination, a tubular member one end of which is provided with longitudinal and bayonet slots to receive the projecting studs of a nipple, the other end of said tubular member having means for securing thereto one end of a grease conduit, a sleeve slidably mounted on the slotted end of said tubular member and having locking means to hold the projecting studs of the nipple in the bayonet slots, and a slidable sealing member in the bore of said tubular member adapted to engage the end of said nipple.

8. A detachable coupling member comprising, in combination, a tubular member one end of which is provided with longitudinal and bayonet slots to receive the projecting studs of a nipple, the other end of said tubular member having means for securing thereto one end of a grease conduit, a spring-pressed sleeve slidably mounted on the slotted end of said tubular member and having locking means to hold the projecting studs of the nipple in the bayonet slots, and a slidable sealing member in the bore of said tubular member adapted to engage the end of said nipple.

9. A detachable coupling member comprising, in combination, a tubular member one end of which is provided with longitudinal and bayonet slots to receive the projecting studs of a nipple, the other end of said tubular member having means for revolubly securing thereto one end of a grease conduit, a spring-pressed sleeve slidably mounted on the slotted end of said tubular member and having locking means to hold the projecting studs of the nipple in the bayonet slots, and a slidable sealing member in the bore of said tubular member actuated solely by the pressure of the lubricant and adapted to engage the end of said nipple.

In testimony whereof I have affixed my signature.

RAYNALDO P. JACQUES.